(No Model.)
L. & V. KONOPINSKI.
MEASURING DEVICE AND FAUCET.
No. 541,363. Patented June 18, 1895.
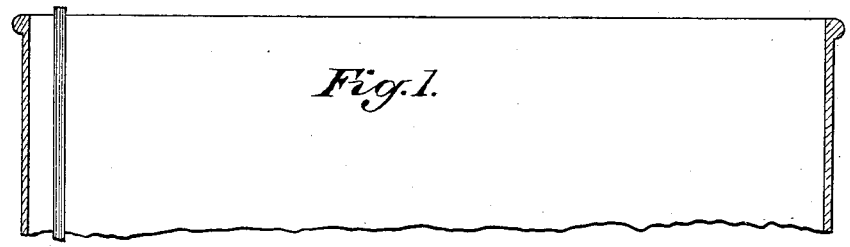
Fig. 1.
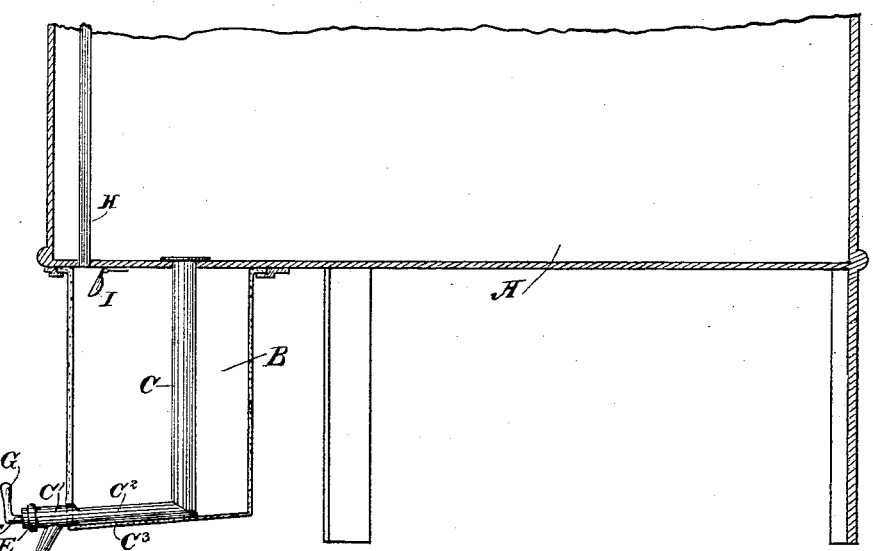
Fig. 2.
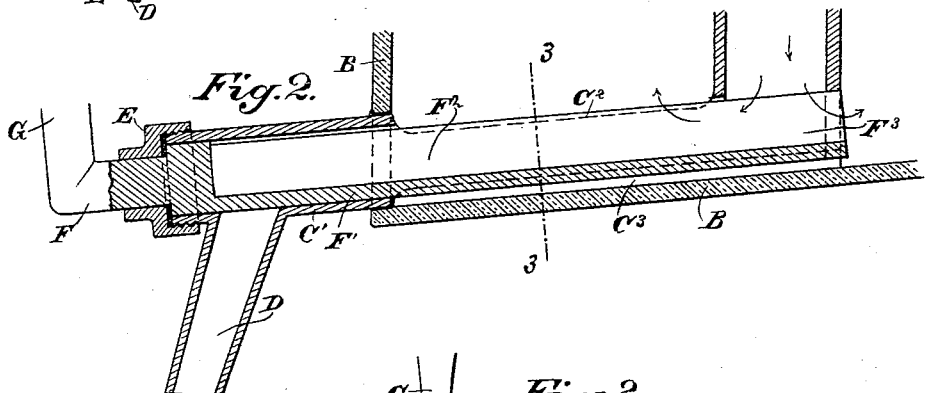
Fig. 3.
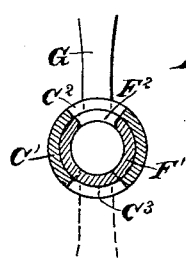
Witnesses,
Inventors,
Leonard Konopinski
Valentine Konopinski
By Dewey & Co.
Attys

UNITED STATES PATENT OFFICE.

LEONARD KONOPINSKI, OF WAUGH, AND VALENTINE KONOPINSKI, OF STOCKTON, CALIFORNIA.

MEASURING DEVICE AND FAUCET.

SPECIFICATION forming part of Letters Patent No. 541,363, dated June 18, 1895.

Application filed February 14, 1895. Serial No. 538,453. (No model.)

*To all whom it may concern:*

Be it known that we, LEONARD KONOPINSKI, residing at Waugh, county of Shasta, and VALENTINE KONOPINSKI, residing at Stockton, county of San Joaquin, State of California, subjects of the Emperor of Germany, have invented an Improvement in Measuring Devices and Faucets; and we hereby declare the following to be a full, clear, and exact description of the same.

Our invention relates to a device for measuring liquids and transferring them from larger to smaller receptacles and a means by which the transfer is made.

It consists in certain details of construction which will be more fully explained by reference to the accompanying drawings, in which—

Figure 1 is a vertical section through our apparatus. Fig. 2 is a detail section through the faucet and connections. Fig. 3 is a cross-section on line 3 3 of Fig. 2.

The object of our invention is to provide a means for transferring liquids from any large containing vessel and measuring the liquid during its transfer, so that any desired quantity may be drawn off with ease and rapidity.

A represents a containing tank, barrel, or vessel of any desired size, shape, or capacity. If specially made, it may have legs or a flange extending downward so that there will be a chamber beneath its bottom to contain the measuring device. If no such holder is in use, our device may be connected with any other form of holder in any suitable mechanical way to enable it to be used.

B is a measuring chamber or vessel which may be made of glass, or other transparent material, and this vessel has a capacity, such as one or two quarts, a gallon, or other amount which will represent the unit of measurement to be used. We have shown this chamber made with a bottom which inclines toward the front so that its contents will all flow down to the lowest side, the chamber being secured by any air-tight connection with the bottom of the chamber A.

Through the bottom of the chamber A extends a pipe C which is made with a tight joint where it enters the chamber A. This pipe extends to the bottom of the chamber B, and is there turned to an angle corresponding with the incline of the floor of the chamber B, along which it extends through the lower front side of B, and to a sufficient distance outside of it to allow the formation or attachment of the discharge nozzle D. Upon the end of this portion C' of the pipe is fitted a tight screw cap E, and through this passes the shank F which forms an extension of the hollow faucet barrel F'. The joint at E is sufficiently tight to prevent any leakage around it, and the faucet barrel and extension F have the handle G by which they may be rotated within the tube or casing C'. This faucet barrel F' has one side slotted or made open as shown at $F^2$. The walls of the tubular pipe C' are slotted or made open at both top and bottom as shown at $C^2$, $C^3$. The inner end of the faucet barrel F' is also made open so as to communicate with the interior of the chamber B as shown at $F^3$.

From the top of the chamber B a pipe H extends upwardly above the surface of the liquid in the holder A, either passing directly up through it, as here shown, or if more convenient, it may lead up exterior to the chamber A. Hinged or otherwise movably fixed beneath the bottom of the pipe H, is a valve I adapted to close against the bottom of the pipe H and prevent any liquid rising up into the pipe when the chamber B is filled, but this valve will open downwardly as soon as the liquid is allowed to flow from the chamber B, thus admitting air to insure a constant flow of the liquid.

The operation of the device will then be as follows: When it is desired to fill the measuring chamber B, the handle G is turned so as to bring the open portion $F^2$ of the faucet barrel F' upwardly and in line with the pipe C. The liquid will then flow down through the pipe C into the faucet barrel F', and as the lower closed portion of the barrel closes the discharge passage D, and the bottom of the casing, the liquid will flow up through the opening $C^2$ in the top of the casing, and also through the open end $F^3$ into the chamber B. As the valve I is normally opened when there is no liquid in the chamber, the air escapes through the pipe H until the chamber is nearly full when the valve, being a float valve, will be gradually closed until at the instant when a chamber is filled, it will be tightly closed against the bottom of the pipe H, thus preventing any more liquid from entering. The chamber B being thus filled, the handle G is now turned in the opposite direction, thus bringing the opening in the barrel F' into communication with the discharge passage D while the closed portion of the faucet barrel is turned upward across the pipe C, and this prevents any further entrance of liquid at this point. The liquid in the chamber B will now flow out through the faucet barrel and discharge pipe, entering at the open end F³ and also through the slot F² which is presented downward and corresponds with a slot C³ made in the lower part of the casing or pipe C' within which the faucet barrel turns. The liquid is thus allowed to flow out rapidly, and by reason of the inclined bottom of the chamber B it is completely discharged.

The closed spaces upon the sides of the faucet barrel F' are of sufficient area, that when the faucet has been turned to a position approximately at right angles with the inlet or discharge, both inlet and discharge will be closed, and any passage of liquid cut off. This closed space is of sufficient size so that the passage C will be cut off before the discharge passage D is opened, and the passage D will be closed before the passage C is opened.

Having thus described our invention, what we claim as new, and desire to secure by Letters Patent, is—

1. A measuring device and faucet, consisting of a chamber of known capacity secured to or connected with the containing vessel, a pipe extending from the containing vessel into the measuring chamber and having an angularly disposed extension open at top and bottom, and passing out through the lower part of the measuring chamber, with an exterior discharge passage, a faucet barrel extending longitudinally throughout the extension and passing under the vertical arm of the pipe from the containing vessel, and turnable within said angular extension of the pipe, having a slotted passage at one side adapted to coincide with the supply pipe and with the interior of the measuring chamber, and to close said communication when turned so that the passage does not coincide, and an air pipe extending from the upper part of the measuring chamber, having a valve at its lower end adapted to be closed by the action of the liquid in the measuring chamber.

2. A measuring device and faucet consisting of a measuring chamber of known capacity connected with the containing vessel, a pipe leading from the containing vessel to near the bottom of the measuring chamber and having an angular extension projecting through the side of said chamber near the bottom with a discharge passage connecting with the lower portion thereof, a faucet barrel parallel with and fitting and turnable within the inclined casing having an exterior handle and a shank extending through a stuffing-box at the end of the casing whereby the faucet barrel is turnable, a slot or channel extending longitudinally along the faucet barrel so as to coincide with the inlet pipe and also deliver into the measuring chamber through a slot in the top of the casing when turned upwardly, and to close said communication and communicate with the discharge passage when turned downwardly and at the same time to communicate with an inlet passage from the measuring chamber formed in the lower part of its casing.

3. A measuring device and faucet consisting of a measuring chamber having an inclined bottom, a pipe connecting the measuring chamber with the containing vessel, and having an inclined casing or extension connected with its lower end extending along the line of the inclined bottom and through the lower side of the measuring chamber, a faucet barrel open at its inner end and having a shank extending outwardly through a stuffing-box in the end of the casing or pipe extension and a handle by which it is turnable, said faucet barrel being parallel with and fitting the casing, having a slot made longitudinally through one of its sides corresponding with the position of the exterior handle, and adapted to coincide with the inlet pipe and also with a slot on the top of the casing which opens into the measuring chamber whereby liquid is admitted from the containing vessel into the measuring chamber, a slot formed in the bottom of the casing with which the slot in the faucet barrel coincides when turned downwardly, and also with the discharge passage whereby the contents of the chamber are entirely discharged through the exterior discharge passage.

In witness whereof we have hereunto set our hands.

LEONARD KONOPINSKI.
VALENTINE KONOPINSKI.

Witnesses:
S. H. NOURSE,
H. F. ASCHECK.